United States Patent [19]

Auracher et al.

[11] 4,136,212

[45] Jan. 23, 1979

[54] METHOD FOR THE PRODUCTION OF LIGHT CONDUCTOR STRUCTURES WITH INTERLAYING ELECTRODES

[75] Inventors: Franz Auracher, Munich; Guido Bell, Gilching, both of Germany

[73] Assignee: Siemens Aktiengesellschaft, Berlin & Munich, Germany

[21] Appl. No.: 804,491

[22] Filed: Jun. 8, 1977

[30] Foreign Application Priority Data

Jun. 14, 1976 [DE] Fed. Rep. of Germany ....... 2626516

[51] Int. Cl.² ............................................. B05D 5/12
[52] U.S. Cl. ........................................ 427/38; 427/43; 427/100; 427/123; 427/264; 427/265; 427/270; 427/271; 427/272; 427/374 R
[58] Field of Search ................... 427/85, 88, 259, 264, 427/265, 272, 376 G, 124, 374, 270, 52, 38, 43, 100, 271, 123, 374 R; 156/643, 662, 659, 667; 350/96.12, 96.14

[56] References Cited

U.S. PATENT DOCUMENTS

| | | | |
|---|---|---|---|
| 3,695,745 | 10/1972 | Furukawa | 350/96.14 |
| 3,794,536 | 2/1974 | Muska | 156/643 |
| 3,983,264 | 9/1976 | Schroen et al. | 427/88 |
| 3,997,687 | 12/1976 | Phillips | 350/96.12 |
| 4,040,891 | 8/1977 | Chang et al. | 427/88 |
| 4,056,304 | 11/1977 | Phillips | 350/96.14 |

Primary Examiner—Cameron K. Weiffenbach
Attorney, Agent, or Firm—Hill, Gross, Simpson, Van Santen, Steadman, Chiara & Simpson

[57] ABSTRACT

A method of producing a light conductor structure or controllable coupler having a pair of light conductors embedded in a substrate of an electro-optical material and having electrodes arranged therebetween characterized by applying a layer of polycrystalline silicon on one surface of the substrate; etching away a portion of the layer to form a doping or diffusion mask; applying a layer of diffusion material on the mask and exposed silicon-free portions of the surface; diffusing the diffusion material into the silicon-free portions to form the light conductors; applying a layer of negative acting photo-lacquer on the layer of diffusion material and the conductors; projecting light through the substrate with the remaining portions of the silicon layer acting as a mask to expose the photo-lacquer; developing the layer of photo-lacquer to remove unexposed portions with the remaining portions of the lacquer covering the light conductors; removing the remaining portions of the silicon layer; applying a metal layer on the one surface to form the electrodes; and then removing the photo-lacquer layer with the metal disposed thereon from the light conductors.

9 Claims, 11 Drawing Figures

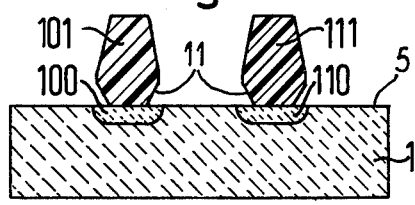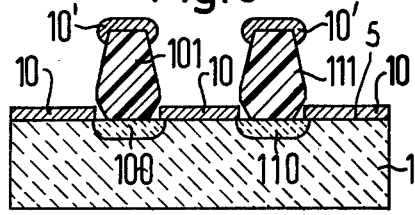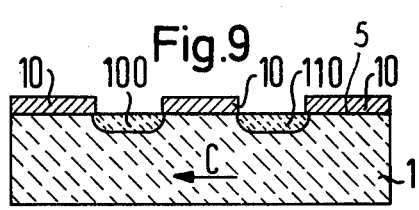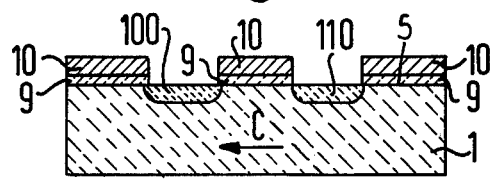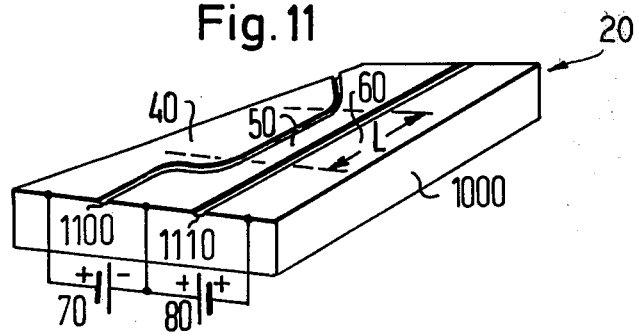

METHOD FOR THE PRODUCTION OF LIGHT CONDUCTOR STRUCTURES WITH INTERLAYING ELECTRODES

BACKGROUND OF THE INVENTION

1. Field of the Invention

The present invention is directed to a method for the production of light conductor structures which have electrodes arranged between the light conductors.

2. Prior Art

Light conducting structures, which have a pair of light conductors on a substrate with an electrode disposed therebetween are known. Such structures are used as electrically controllable directional couplers in optical communication technology and act as on/off switches or cross-over switches. In addition, such structures are used as electrical-optical modulators.

A common feature of these structures is that the two light conductors possess a zone in which they are very closely adjacent to one another. Electrodes are arranged between the light conductors and beside each of the light conductors. In this zone, a typical value for the spacing between a pair of light conductors is 3 μm. This means that the electrodes must be precisely aligned in their position and that permissible tolerances in the location of the electrodes are less than 1 μm.

German Offenlegungsschrift No. 2,526,117 describes a method for producing this type of light conductor structure. As disclosed in this reference, a metal layer is applied to a substrate consisting of a ferroelectric material. This metal layer is removed in the regions where the light conductors are to be formed so that the surface of the substrate is exposed at these regions or areas. Thereafter, a diffusion material is applied to the metal layer and to the exposed zones or areas of the surface of the substrate. During a high temperature diffusion process, this diffusion material diffuses into the exposed zones of the substrate to increase the index of refraction of the substrate in these zones so that these zones having the increased index of refraction act as light conductors or optical waveguides. In the region of the two waveguides, opposing, remanent electric polarizations are now produced in the substrate and the metal located between the light conductors is then removed from the substrate. The remaining metallizations which are present on the surface of the substrate serve as the electrodes.

Fundamentally, this production or method could also be used for the production of electrodes located between two light conductors. As a variation of the process described in the above-mentioned German reference, the metallization located between the light conductors would then have to remain on the substrate. This metallization would then serve as an electrode, and as a result of the production process this electrode would be automatically positioned between the light conductors with a high or extreme accuracy.

Since, however, the metallizations are exposed to high temperatures during the diffusion process for the production of the light conductors, it is unavoidable that a portion of the metallizations will also diffuse into the substrate. However, this condition is extremely undesirable and would thereby reduce the quality of the light conductors. In particular, a danger exists that a light conducting layer will form beneath the metallizations.

In addition, the danger exists that the metallizations will become oxidized and thus might become electrically non-conductive. It is also possible that without special adhesives, the metallizations will not adhere sufficiently firmly upon the substrate so that at the high temperatures prevailing during the diffusion process, the metallizations can contract to form small islands which are insulated from one another.

SUMMARY OF THE INVENTION

The present invention is directed to a method for forming a light conducting structure having interlying electrodes which are extremely accurately dimensioned within narrow tolerances and which process avoids the difficulties which occurred with prior art processes.

To accomplish these aims, the present invention is directed to a method for forming a light conductor structure having a pair of light conductors embedded in one surface of a substrate of an electro-optical material having its c-axis extending parallel to the surface and at right angles to the light conductors and having electrodes extending between and along the light conductors, said structure being particularly adapted for use as an electrically controllable coupler. The method comprises the steps of providing a substrate of the electro-optical material having said one surface; applying a layer of polycrystalline silicon on said one surface of the substrate; removing a portion of the silicon layer from said one surface by etching to provide silicon-free portions or zones on said one surface having a configuration of the light conductors which are to be formed with the remaining portions of the silicon layer forming a mask; applying a layer of diffusion material on the silicon layer and the silicon-free portions of the one surface of the substrate, diffusing the diffusion material into the surface of the substrate at said silicon-free portions to form light conductors having an index of refraction greater than the index of refraction of the substrate by heating to an elevated temperature; cooling the substrate; applying a layer of negative-acting photo or light sensitive lacquer to the light conductor and the layer of diffusion material; exposing said layer of negative-acting photo or light sensitive lacquer by projecting light through the substrate with the remaining portion of the layer of silicon acting as a mask; developing the layer of the photo-lacquer so that the unexposed portions are removed and the remaining lacquer layer covers the light conductors; removing the remaining portions of the silicon layer with diffusion material thereon from said one surface; applying a metal layer on said one surface to form the electrodes; and then removing the photo-lacquer with the metal disposed thereon from the light conductor.

Preferably, prior to applying the metal layer to form the electrodes, a thin dielectric layer, whose index of refraction is lower than that of the substrate, is applied to the substrate and is then followed by the application of the metal layer forming the electrodes. Preferably, prior to the step of etching the polycrystalline silicon, the layer of silicon is subjected to ion bombarding so that beveled etching edges are formed during the subsequent etching process. The substrate is preferably either a lithium tantalate crystal or a lithium niobate crystal.

BRIEF DESCRIPTION OF THE DRAWINGS

FIGS. 1–10 are cross-sectional views illustrating the steps of the method of producing the light conducting structure in accordance with the present invention; and FIG. 11 is a perspective view of a light conductor structure produced in accordance with the method of the present invention.

DESCRIPTION OF THE PREFERRED EMBODIMENT

Figure 1:
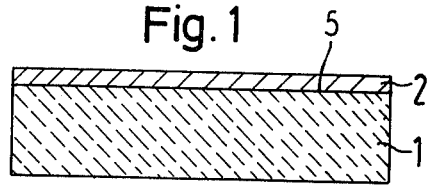

The principles of the present invention are particularly useful for producing a light conductor structure generally indicated at 20 in FIG. 11.

To produce this structure 20, a substrate 1, which consists of an electro-optical crystal, for example, lithium niobate (LiNbO₃) or lithium tantalate (LiTaO₃) is provided. The substrate 1 has a substrate surface 5 and the c-axis of the substrate extends parallel to the surface 5 and at right angles to the direction of the longitudinal axis of the later formed light conductors. A polycrystalline silicon layer 2, which has a thickness of approximately 400 nm, is applied to the substrate surface 5.

After applying the silicon layer 2, a photo-lacquer layer is applied on the layer 2. The layer 2 is exposed using a desired mask and developed to provide an etching mask 3, which exposes portions or zones 6 of the silicon layer 2. Thus, after forming the mask 3, the zones 6 of the substrate, which zones have the configuration or shape of the later formed light conductors or light waveguides, will not be covered by the mask 3 while those zones which are not to be formed into the light conductors will be covered.

Figure 3:
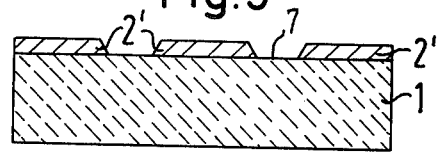

Subsequent to forming the mask 3, which is defined by the developed photo-lacquer layer, the layer 2 of polycrystalline silicon is etched until portions 7 of the surface 5 of the substrate 1 are exposed. Thus, the surface 5 has portions 7, which are silicon-free portions and portions covered by the remaining portions 2' of the layer of polycrystalline silicon. After etching, the photo-lacquer layer is removed. As illustrated in FIG. 3, the state of the substrate 1 is now that it has exposed portions 7 which will be subsequently provided for the later formed light conductors and the surface 5 is covered by a diffusing mask comprising the remaining portions 2' of the polycrystalline silicon layer between and beside these zones 7.

Figure 2:
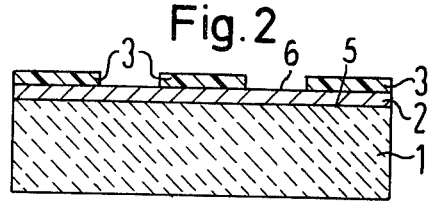

For the remainder of the method or process, it is advantageous for the remaining portions 2' of the polycrystalline silicon mask to have beveled etching edges. This can be achieved in the following manner. Before etching the layer 2 of silicon, the zones 6 of the polycrystalline silicon layer, which were free of the photo-lacquer as illustrated in FIG. 2, are subjected to a step of ion bombarding. During the step of ion bombarding, the energy of the ions can have energies between 500 to 1,000 eV, for example, 600 eV. The particle density of the ion beam can amount to approximately $10^{15}$ to $10^{17}$ ions per centimeter². The ions can consist, for example, of argon ions. As a result of this step, the polycrystalline silicon treated in this way is attacked more strongly during the etching and thus produces beveled etching edges. The advantage of these beveled etching edges will be explained later in the description of the production steps for the electrodes.

Figure 4:
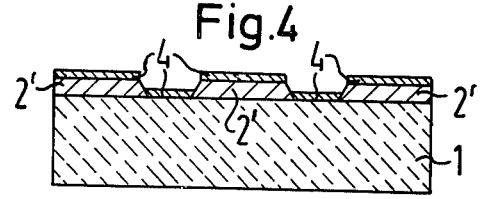

Light conductors are now produced by means of a diffusion or doping process. For this purpose, as illustrated in FIG. 4, a layer of diffusion material 4 is applied to the structure which has been formed so far. This can be effected, for example, by vapor depositing or sputtering. Suitable diffusion materials are titanium or niobium. The diffusion material of the layer 5 will have a thickness of between approximately 30 to 50 nm.

To diffuse the material of the layer 4 into the substrate 1, the substrate is heated to approximately 950° C. to 980° C. for approximately 3 to 5 hours. During this high temperature process, the diffusion material in the layer 4 will diffuse into the substrate at the surface areas 7 which are not covered by the polycrystalline silicon mask 2'. As a result of the penetration of the diffusion material into the substrate, zones 100 and 110 are formed which zones have an index of refraction, which is higher than the index of refraction of the substrate, and these zones will act as light conductors or waveguides. After heating the structure to accomplish the diffusion to form the light conductors 100 and 110, the substrate is cooled in an oxygen atmosphere for the following reasons. During the preceding diffusion process, not only does diffusion material diffuse into the substrate 1 but the substrate also will lose oxygen as a result of diffusion. As a result of this diffusion loss of oxygen, the substrate 1 will become colored and develop absorption properties. By cooling the substrate from the elevated diffusion temperature range in an oxygen atmosphere, the oxygen supplied to the substrate during the cooling will render the substrate clear again and restore its original, high, optical transparency.

The Curie temperature of lithium tantalate is below the temperature range of the diffusion process. In order to insure that the c-axis is aligned and parallel to the substrate surface and at right angles to the longitudinal axis of the light conductors 100 and 110 after the diffusion step, the substrate consisting of lithium tantalate must be poled or biased during the cooling from the elevated temperatures. To accomplish this, auxiliary electrodes, which are connected to a DC voltage source, are arranged beside the two substrate edges which lie parallel to the light conductors 100 and 110. The application of a DC voltage to the auxiliary electrodes produces an electric field in the substrate which is parallel to the substrate surface 5 and at right angles to the longitudinal axis of the waveguides 100 and 110. This inevitably will produce the corresponding orientation of the c-axes of the substrate 1 consisting of lithium tantalate.

When the substrate consists of lithium niobate, this additional poling is not necessary because the Curie temperature of lithium niobate is above the temperature range of the diffusion process.

Figure 5:
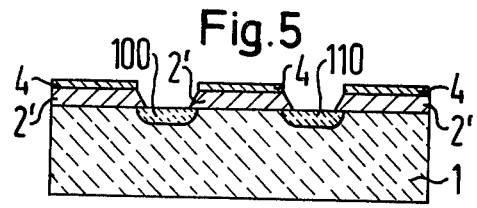
Figure 6:
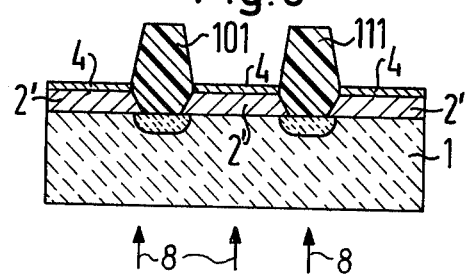

For the remaining steps of the method, it is desirable to have the light conductors 100 and 110 covered with a photo-lacquer. For this purpose, a layer of negative-acting photo-lacquer is applied to the structure as illustrated in FIG. 5. This photo-lacquer is exposed to light which is directed through the substrate 1 as illustrated by arrows 8 (FIG. 6) and the remaining portions 2' of the polycrystalline silicon acts as a light impermeable mask. After exposing the negative-acting photo-lacquer layer, it is developed so that those parts of the photo-lacquer layer, which have not been exposed to light become detached and the exposed portions are retained as strips 101, 111 and remain on the light conductors as illustrated in FIG. 6.

After forming the photo-lacquer strips 101 and 111 to cover the zones or light conductors 100 and 110, respectively, the remaining portions 2' of the layer of polycrystalline silicon as well as the remaining portion of the diffusion material 4 are removed. To accomplish this, the remaining portions 2' of the polycrystalline silicon is removed by etching, which is carried out in a plasma composed of methane tetrafluoride (CF₄). For this purpose, the structure of FIG. 6 is introduced into a vacuum chamber filled with methane tetrafluoride, wherein the pressure is normally between 0.5 to 1 torr. In this gas atmosphere, a gas discharge is now produced, for example by an electric high frequency field, which has a typical frequency value of 13.5 MHz. Since the layer of polycrystalline silicon is covered by the titanium or niobium layer 4 of diffusion material, the etching attack takes place only at the exposed edges of the remaining portions 2' of the polycrystalline silicon. With an etching time of approximately 30 to 40 minutes, the silicon layer is laterally etched away to a width of approximately 10 μm.

In order to avoid long etching times, it is advantageous to construct the etching mask 3 of the photo-lacquer layer (FIG. 2) in such a way that fundamentally only a 10 μm wide strip of photo-lacquer remains beside the zones 6 of the silicon layer 2, which zones 6 subsequently denote the zones in which the light conductors are formed. Thus, silicon layer 2 has surface zones 6 which remain free of photo-lacquer, and also has additional photo-lacquer-free zones, which are spaced at a distance of more than approximately 10 μm from the edges of zones 6. These additional zones have practically no influence on the coupled waveguides 100, 110, because the separation of ≧ to 10 μm from them is too large to cause any noticeable coupling. The area between the zones 6 and those additional zones, which are spaced therefrom, are covered with the photo-lacquer layer 3. During the following etching of the polycrystalline silicon, only those parts of the layer of polycrystalline silicon which lie beneath the strips 3 of photo-lacquer will be the remaining portions 2' of the silicon layer.

After etching with the methane tetrafluoride to remove the remaining portions 2' of the silicon layer from the surface 5 of the substrate 1, a structure such as illustrated in FIG. 7 is obtained. As illustrated, the light conductors 100 and 110 are still covered by the strips of the photo-lacquer 101 and 111, respectively.

In order to provide the electrodes, a metal layer 10 (FIG. 8) which consists, for example of aluminum, is applied to the structure. This application can be effected, for example by vapor deposition or sputtering. If aluminum is used, the substrate can be heated to a temperature of approximately 300° C. during the vapor deposition step. The evaporated metal layer will have a thickness of between 200 and 400 nm.

If the etching edges of the remaining portions 2' of the silicon layer have been beveled in accordance with the advantageous embodiment of the invention, the photo-lacquer strips 101 and 111 will possess undercut surfaces 11 (FIG. 7). As a result of these undercut surfaces 11, a narrow interspace between the vapor deposited metal 11 and the photo-lacquer strips 101 and 111 will occur during the vapor deposition of the metal layer 11. During a subsequent stripping of the photo-lacquer strips 101 and 111 by means of a solvent, the solvent can penetrate into this interspace so that the photo-lacquer strips can be removed more rapidly.

To remove the photo-lacquer strips 101 and 111 and the portion or the metal layer 10', which was deposited thereon during the depositing of the electrode layers 10, a commercially available stripper for positive or negative photo-lacquers can be utilized. The photo-lacquer will first swell up so that the metal portion 10' which is disposed thereon will be removed from the strip and at the same time the photo-lacquer strips 101 and 111 will become detached from the base or conductors 100 and 110.

As a result of removing the strips 101 and 111, a structure of FIG. 9 is produced. The two light conductors 100 and 110 are embedded in the substrate 1, which consists of an electro-optical crystal. The c-axis of the substrate 1 is aligned parallel to the substrate surface and at right angles to the longitudinal axis of the light conductors 100 and 101. Beside each of the light conductors 100 and 110 and therebetween are arranged electrodes, which are formed by the metal layer 10 and to which a voltage can be connected so that the two light conductors can be optically tuned relative to one another and thus modify the coupling between the two light conductors.

In accordance with an advantageous embodiment of the method of the present invention, a thin, dielectric layer 9 (FIG. 10) which possesses a lower index of refraction than the index of refraction of the substrate is deposited on the surface 5 of the substrate prior to applying the metal layer 10. The function of this dielectric layer 9 is to optically isolate the electrodes from the light conductors. Since the index of refraction of this dielectric layer is lower than that of the substrate, it acts as a light conductor cladding for the light conductors, i.e., at the boundary area between the light conductors 100 and 110 and the dielectric layer 9 a light beam is reflected back into the light conductors 100 and 110. This serves to avoid light losses. The aforementioned dielectric layer can be applied, for example by vapor deposition or sputtering of a glass prior to the application of the metal layer 10 which forms the electrodes.

As illustrated in FIG. 11, a finished structure 20 which serves as a modulator is illustrated. In this modulator or structure 20, a substrate 1000 is provided with two embedded light conductors 1100 and 1110, which are closely adjacent to one another along a coupling length L. Between and beside the light conductors 1100 and 1110, the substrate has electrodes 40, 50 and 60. By connecting a voltage from voltage sources 70 and 80 to these electrodes, it is possible to modify the optical properties of the light conductors 1100 and 1110.

Although various minor modifications might be suggested by those versed in the art, it should be understood that we wish to embody within such modifications as reasonably and properly come within the scope of our contribution to the art.

We claim:

1. A method of forming a light conductor structure having a pair of light conductors embedded in one surface of a substrate of an electro-optical material having its c-axis extending parallel to the one surface and at right angles to the light conductors and having electrodes extending between the light conductors, said structure being particularly adapted for use as an electrically controllable coupler, said method comprising the steps of providing a substrate of the electro-optical material having said one surface; applying a layer of polycrystalline silicon on said one surface of the substrate; removing a portion of the silicon layer from said one surface by etching to provide silicon-free portions of said one surface having a configuration of the light conductors, which are to be formed, with the remaining portions of the silicon layer forming a mask; applying a layer of diffusion material on the silicon layer and said silicon-free portions of said one surface of the substrate; diffusing the diffusion material into the surface of the substrate at said silicon-free portions to form light conductors having an index of refraction greater than the index of refraction of the substrate by heating to an elevated temperature; cooling the substrate; applying a layer of negative acting photo-lacquer to the light conductors and the layer of diffusion material; exposing said layer of negative acting photo-lacquer by projecting light through the substrate with the remaining portions of the silicon layer acting as a mask; developing the layer of photo-lacquer so that the unexposed portions are removed and the remaining portions of the lacquer cover the light conductors; removing the remaining portions of the silicon layer with the diffusion layer thereon from said one surface; applying a metal layer on said one surface to form the electrodes and then removing the photo-lacquer strips with the metal deposited thereon from the light conductors.

2. A method according to claim 1, wherein the material of the substrate comprises a lithium niobate crystal.

3. A method according to claim 1, wherein the material of the substrate is a lithium tantalate crystal.

4. A method according to claim 2, wherein said elevated temperature is above the Curie temperature of the lithium tantalate crystal and wherein during the step of cooling the substrate is subjected to an electrical field, which is parallel to said one surface and at right angles to the longitudinal axes of the light conductors so that the c-axis of the substrate has the desired orientation.

5. A method according to claim 1, which includes prior to the step of applying a metal layer, applying a thin dielectric layer to the exposed portions of said one surface, said thin dielectric layer having an index of refraction lower than the index of refraction of the substrate.

6. A method according to claim 5, which includes prior to the step of removing portions of the silicon layer by etching, a step of ion bombarding the polycrystalline silicon so that during the subsequent etching step, beveled etching edges are formed on the remaining portion of the silicon layer.

7. A method according to claim 1, which includes prior to the step of removing a portion of the silicon layer by etching subjecting a silicon layer to ion bombardment so that during the subsequent etching step, beveled etching edges are formed on the remaining portion of the silicon layer.

8. A method according to claim 5, wherein the material of the substrate is a lithium tantalate crystal.

9. A method according to claim 7, wherein the material of the substrate is a lithium niobate crystal.

* * * * *